(12) United States Patent
Sung

(10) Patent No.: US 6,184,945 B1
(45) Date of Patent: Feb. 6, 2001

(54) LIQUID CRYSTAL DISPLAY APPARATUS IN WHICH ELECTRODE FILM FORMING CAPACITOR IN COOPERATION WITH PIXEL ELECTRODE IS CONNECTED TO GATE WIRING VIA CONNECTING PATH

(75) Inventor: Chae Gee Sung, Miyagi-ken (JP)

(73) Assignee: Frontec Incorporated, Miyagi-Ken (JP)

( * ) Notice: Under 35 U.S.C. 154(b), the term of this patent shall be extended for 0 days.

(21) Appl. No.: 09/132,921

(22) Filed: Aug. 12, 1998

(30) Foreign Application Priority Data

Aug. 18, 1997 (JP) .................................................. 9-221803

(51) Int. Cl.⁷ ................................................. G02F 1/1343
(52) U.S. Cl. ................................................. 349/38; 349/39
(58) Field of Search ................................ 349/38, 34, 42, 349/43, 44, 47, 110

(56) References Cited

U.S. PATENT DOCUMENTS

| | | |
|---|---|---|
| 5,510,916 | 4/1996 | Takahashi . |
| 5,742,363 * | 4/1998 | Bae ......................................... 349/38 |
| 5,834,328 * | 11/1998 | Jang ........................................ 438/30 |
| 5,835,169 * | 11/1998 | Kwon ..................................... 349/38 |
| 5,917,563 * | 6/2000 | Matsushima ............................ 349/38 |

FOREIGN PATENT DOCUMENTS 4-326329 * 11/1992 (JP) ...................................... 349/138

* cited by examiner

Primary Examiner—Kenneth Parker
(74) Attorney, Agent, or Firm—Brinks Hofer Gilson & Lione

(57) ABSTRACT

A liquid crystal display apparatus comprises: a substrate; gate wires and source wires formed in a matrix fashion on the substrate; gate electrodes formed close to points of intersection between the gate wires and the source wires, the gate electrodes being connected electrically to the gate wires; a first insulating film formed on the gate wires and the gate electrodes, the first insulating film further carrying the source wires thereon; a semiconductor active film formed over the gate electrodes with the first insulating film interposed therebetween; source electrodes formed on the semiconductor active film and connected to the source wires; drain electrodes formed on the semiconductor active film and isolated from the source electrodes; an electrode film intended to generate capacity and formed on the first insulating film, the electrode film being close to and in parallel with at least the source wires; a second insulating film formed on the first insulating film which carries the electrode film, the source wires, the source electrodes, the drain electrodes and the semiconductor active film thereon; and pixel electrodes connected to the drain electrodes and formed on the second insulating film in order to generate capacity in cooperation with the electrode film.

6 Claims, 10 Drawing Sheets

LIQUID CRYSTAL DISPLAY APPARATUS IN WHICH ELECTRODE FILM FORMING CAPACITOR IN COOPERATION WITH PIXEL ELECTRODE IS CONNECTED TO GATE WIRING VIA CONNECTING PATH

BACKGROUND OF THE INVENTION

1. Field of the Invention

The present invention relates to a liquid crystal display apparatus comprising thin film transistors. More particularly, the invention relates to a liquid crystal display apparatus having a structure with electrodes which are faced with pixel electrodes and which generate cumulative capacity.

2. Description of the Related Art

FIGS. 10 and 11 show a typical constitution of a thin film transistor array substrate used by a conventional thin film transistor liquid crystal display apparatus. The substrate carries on its surface gate wires G and source wires S.

The thin film transistor array substrate of FIGS. 10 and 11 is a transparent substrate 13 illustratively made of glass having gate wires G and source wires S deposited thereon in matrix fashion. Each of the areas surrounded by the gate wires C and source wires S serves as one pixel 1. Each pixel is furnished with a thin film transistor T100.

The thin film transistors T100 shown in FIGS. 10 and 11 are of common, inversely staggered type. Each gate wire G and a gate electrode 2 forming part of the gate wire G in question are covered with a gate insulating film 3. On the gate insulating film 3 over the gate electrode 2 is a semiconductor active film 4 which is made of amorphous silicon (a-Si) and which faces the gate electrode 2. A drain electrode 6 and a source electrode 7, both made of a conductive material, are positioned face to face on two edges of the semiconductor active film 4. The upper portions of the two edges of the active film 4 are covered with ohmic contact films 8, 8 formed illustratively of amorphous silicon doped with impurities (i.e., donors) such as phosphorus of a high density.

A passivation film 10 made of an insulating film is deposited over the gate insulating film 3, source electrodes 6 and drain electrodes 7. On the passivation film 10 are pixel electrodes 11 which, constituted by a transparent conductive material such as ITO (indium tin oxide), cover almost all pixels 1 ranging from top to side of the drain electrodes 6. The pixel electrodes 11 and the passivation film 10 are covered with an oriented film, not shown. Above the oriented film are liquid crystal and an opposite substrate having common electrodes. The whole structure constitutes an active matrix liquid crystal display apparatus. When a transparent pixel electrode 11 applies an electric field to liquid crystal molecules, the orientation of the molecules is controlled as desired.

In the liquid crystal display apparatus having the constitution of FIGS. 10 and 11, auxiliary electrodes 12 formed simultaneously with the gate electrodes 2 on the substrate 13 are installed opposite to the pixel electrodes 11. As illustrated in FIG. 11, the auxiliary electrodes 12 are furnished so as to surround the contour of each pixel 1 corresponding to the circumference of each pixel electrode 11. Each pixel electrode 11 and its corresponding auxiliary electrode 12 sandwich the passivation film 10 to constitute a capacitor providing a cumulative capacity that is used to inhibit the adverse effects of a parasitic capacity generated naturally upon liquid crystal activation.

In the liquid crystal display apparatus of the above constitution, the transparent substrate 13 is usually backlighted. The backlight is shielded by, or allowed to transmit, the orientation-controlled liquid crystal to let the user recognize the contrast on display.

In the constitution shown in FIGS. 10 and 11, each pixel electrode 11 and its corresponding auxiliary electrode 12 sandwich the gate insulating film 3 and passivation film 10 to form the cumulative capacity. While advantageous in driving the liquid crystal, the above constitution is known to have the following major deficiencies:

The gate insulating film 3 is interposed between the gate electrodes 2 and the semiconductor active film 4 for insulation purposes. To attain the good insulating property of the gate insulating film 3 requires strictly managing conditions for forming the film. On the other hand, the passivation film 10 is generally formed under less severe conditions than the gate insulating film 3 because the quality demanded of the passivation film is not so high.

In the conventional structure of FIGS. 10 and 11 where each pixel electrode 11 and its corresponding auxiliary electrode 12 sandwich the gate insulating film 3 and passivation film 10 to form cumulative capacity, two insulating films constitute the cumulative capacity. This makes it difficult to secure appreciable quantities of cumulative capacity. It is also difficult to control the cumulative capacity level to a desired value.

SUMMARY OF THE INVENTION

It is therefore an object of the present invention to provide a liquid crystal display apparatus for allowing its cumulative capacity to be set more easily than before to ensure signal stabilization and numerical aperture improvement, the apparatus being fabricated with a fewer number of masks in a more simplified fabrication setup than before.

In carrying out the invention and according to one aspect thereof, there is provided a liquid crystal display apparatus comprising: a substrate; gate wires and source wires formed in a matrix fashion on the substrate; gate electrodes formed close to points of intersection between the gate wires and the source wires, the gate electrodes being connected electrically to the gate wires; a first insulating film formed on the gate wires and the gate electrodes, the first insulating film further carrying the source wires thereon; a semiconductor active film formed over the gate electrodes with the first insulating film interposed therebetween; source electrodes formed on the semiconductor active film and connected to the source wires; drain electrodes formed on the semiconductor active film and isolated from the source electrodes; an electrode film intended to generate capacity and formed on the first insulating film, the electrode film being close to and in parallel with at least the source wires; a second insulating film formed on the first insulating film which carries the electrode film, the source wires, the source electrodes, the drain electrodes and the semiconductor active film thereon; and pixel electrodes connected to the drain electrodes and formed on the second insulating film in order to generate capacity in cooperation with the electrode film.

With the above structure, the cumulative capacity is formed not by a plurality of insulating films as is the case with conventional structures but by a single insulating film. This means that the inventive structure using a single film may have a reduced facing electrode area to provide the same cumulative capacity as that of the conventional structure utilizing a plurality of insulating films. Hence an improved numeral aperture for the liquid crystal display apparatus of the invention can be obtained.

In the above liquid crystal display apparatus, the single-film structure, if arranged to have the same facing electrode area as that of the conventional multiple-film structure, offers a greater cumulative capacity than the latter. The cumulative capacity thus enhanced ensures better signal stabilization.

In the inventive structure above, cumulative capacity is formed by the electrode film and pixel electrodes sandwiching the second insulating film which acts as a dielectric film. Because there is only one dielectric film for generating cumulative capacity, the inventive liquid crystal display apparatus may set the cumulative capacity level more accurately than the conventional structure that has a plurality of insulating films.

Furthermore, where the second insulating film is sandwiched by the edges of each pixel electrode and by the electrode film in the inventive structure, lines of electric force generated by the edge portion of the pixel electrode are different from those created in the middle portion of the pixel electrode. This permits slightly different states of liquid crystal orientation to occur reflecting the different lines of electric force on the fringe side and in the middle of each pixel electrode. In other words, the liquid crystal display apparatus has two different states of liquid crystal orientation in two domains: on the fringe, and in the middle of each pixel electrode, along the different lines of electric force generated thereby. Such a multi-domain display structure, with its differently oriented states of liquid crystal, helps ease the problem of the narrow angle of visibility characteristic of conventional liquid crystal displays.

In one preferred structure according to the invention, the electrode film may be arranged to penetrate the first insulating film so as to be connected directly with the gate wires. This preferred structure reduces the number of masks used for fabrication by photolithography, whereby the yield of the apparatus is improved.

In another preferred structure according to the invention, connecting paths may be formed simultaneously with the pixel electrodes in order to connect the electrode film electrically with the gate wires. This structure is characterized by its connecting paths connecting electrically the electrode film with the gate wires, the paths being formed at the same time as the pixel electrodes.

According to another aspect of the invention, there is provided a liquid crystal display apparatus comprising: a substrate; a plurality of source wires formed in parallel with one another on the substrate; source electrodes connected to the source wires and formed on the substrate; drain electrodes isolated from the source electrodes and formed on the substrate; a semiconductor active film for connecting the source electrodes with the drain electrodes; a first insulating film formed over the substrate which carries the source wires, the source electrodes, the drain electrodes and the semiconductor active film thereon; gate electrodes formed on the semiconductor active film with the first insulating film interposed therebetween; gate wires formed on the first insulating film to connect with the gate electrodes, the gate wires being arranged to intersect the source wires; an electrode film intended to generate capacity and formed on the first insulating film, the electrode film being close to and in parallel with at least the gate wires; a second insulating film formed on the first insulating film which carries the electrode film, the gate wires and the gate electrodes thereon; and pixel electrodes connected to the drain electrodes and formed on the second insulating film in order to generate capacity in cooperation with the electrode film.

In the above liquid crystal display apparatus, as is the case with the preceding apparatus of the invention, a single-film structure generates cumulative capacity. Thus the inventive structure may have a reduced facing electrode area to provide the same cumulative capacity as that of the conventional structure employing a plurality of insulating films. This provides an improved numeral aperture for the liquid crystal display apparatus. The single-film structure, when arranged to have the same facing electrode area as that of the conventional multiple-film structure, offers a greater cumulative capacity than the latter. This ensures better signal stabilization.

These and other objects, features and advantages of the invention will become more apparent upon a reading of the following description and appended drawings.

DESCRIPTION OF THE PREFERRED EMBODIMENTS

Preferred embodiments of this invention will now be described with reference to the accompanying drawings. These embodiments should not be construed as limiting the scope of the invention but as merely providing illustrations of the presently preferred embodiments of this invention.

Figure 1:
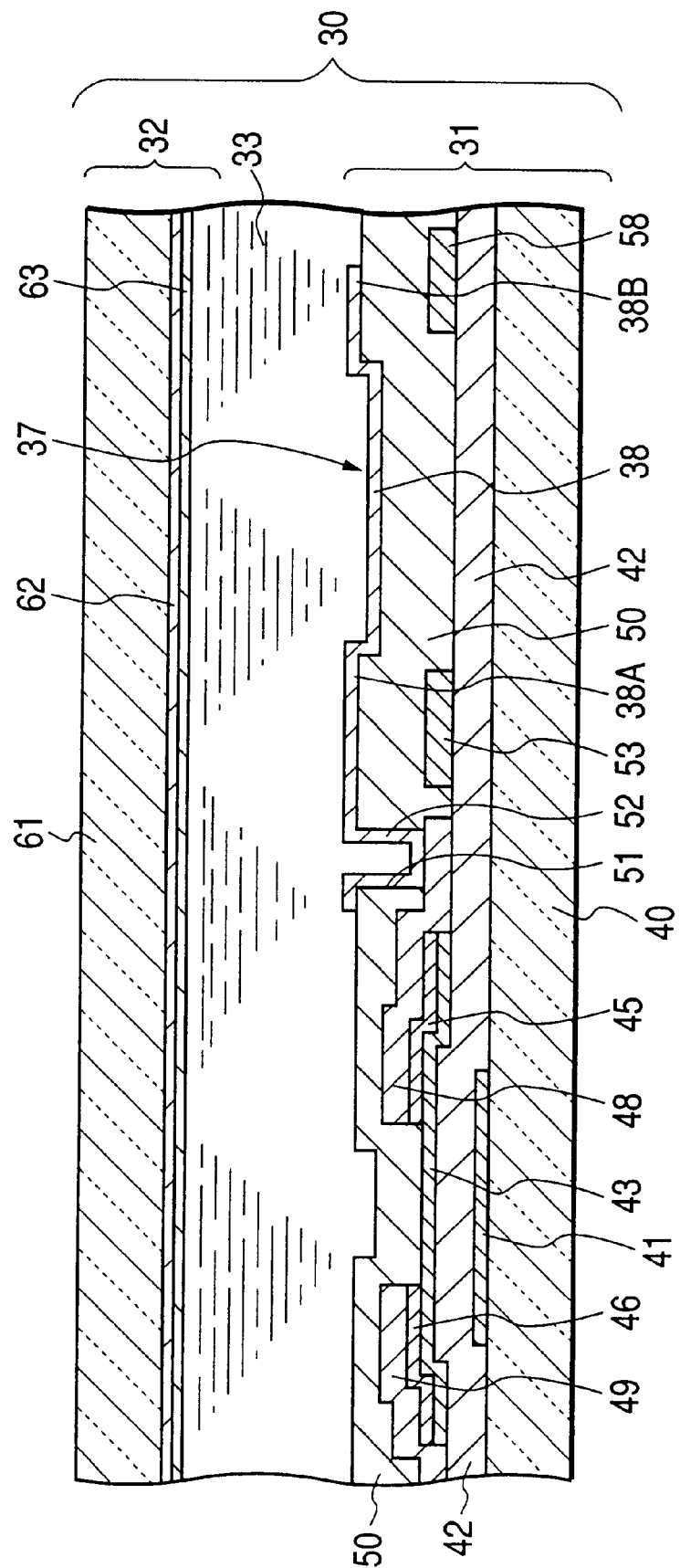
FIG. 1 is a cross-sectional view of a liquid crystal display apparatus of an inversely staggered type practiced as a first embodiment of the invention.
Figure 2:
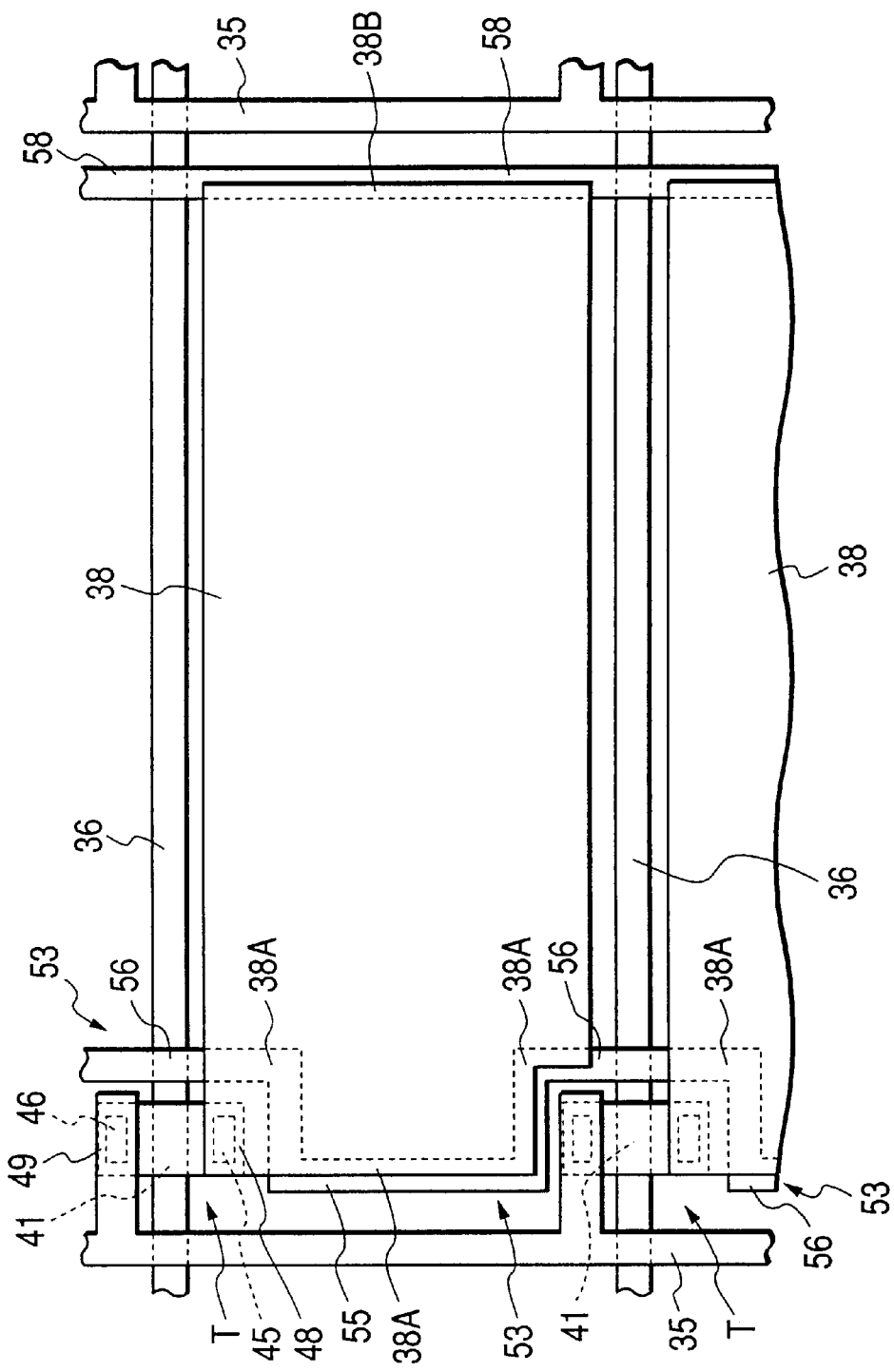
FIG. 2 is a plan view of the first embodiment.

FIGS. 1 and 2 show key portions of an inversely staggered type active matrix liquid crystal display apparatus 30 practiced as the first embodiment of the invention. The liquid crystal display apparatus 30 comprises a thin film transistor array substrate 31, a transparent facing substrate 32 positioned parallel to and separate from the thin film transistor array substrate 31, and liquid crystal 33 contained interposingly between the thin film transistor array substrate 31 and the facing substrate 32.

Figure 10:
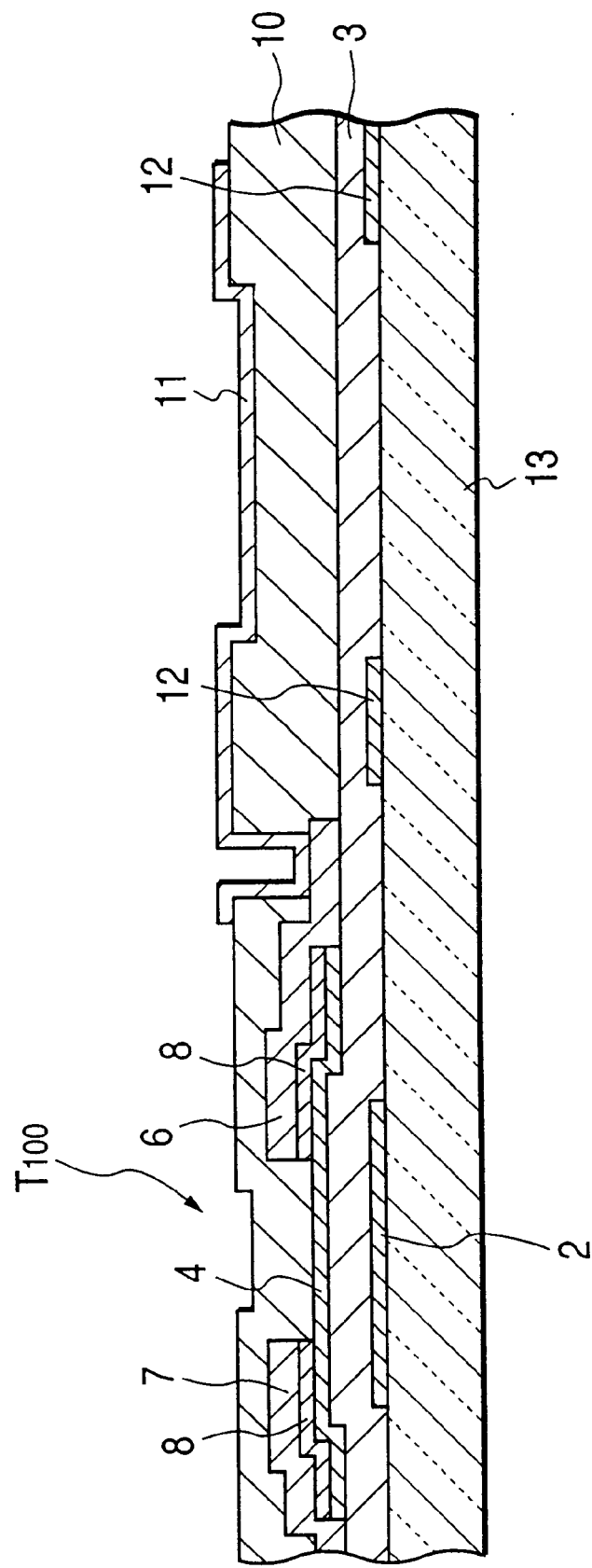
FIG. 10 is across-sectional view of a thin film transistor array substrate included in a conventional liquid crystal display apparatus.
Figure 11:
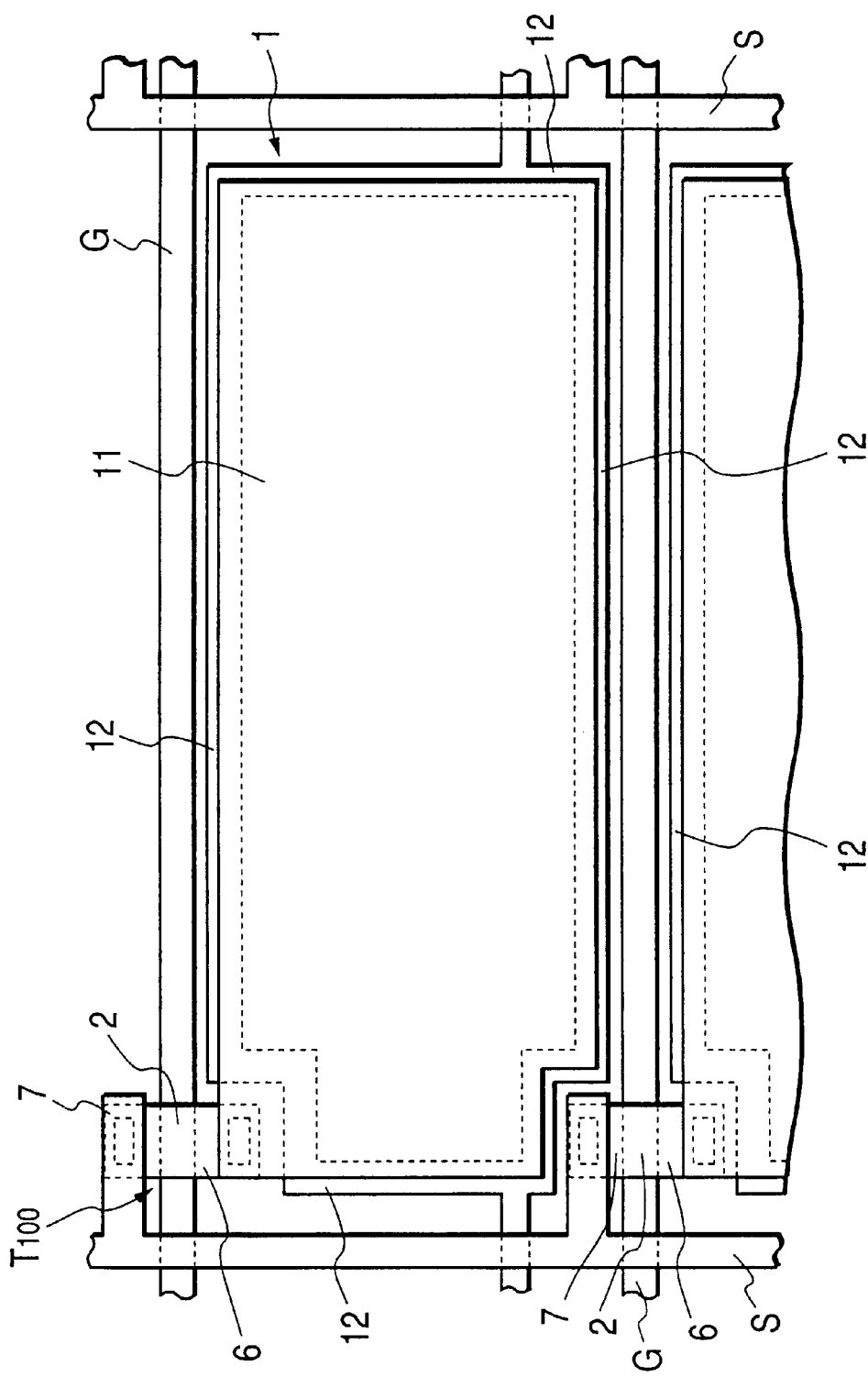
FIG. 11 is a plan view of the thin film transistor array substrate of FIG. 10.

On the thin film transistor array substrate 31, as many source wires 35 and gate wires 36 as in the case of the conventional structure in FIGS. 10 and 11 are arranged in a matrix fashion (viewed from above) as shown in FIG. 2. Each of the numerous areas surrounded by the source wires 35 and gate wires 36 forms a pixel part 37. A pixel electrode 38 made of a transparent conductive material such as ITO (indium tin oxide) is formed in each of the areas representing the pixel parts 37. In one corner of each of the pixel parts 37, a thin film transistor T is formed so as to extend to part of an adjacent pixel part 37.

FIG. 2 is a plan view showing a thin film transistor T and its surroundings corresponding to one pixel part 37 surrounded by source wires 35 and gate wires 36. Numerous pixel parts 37 are arranged on the thin film transistor array substrate 31 to form a display screen of the liquid crystal display apparatus 30.

More specifically, the thin film transistor array substrate 31 is structured as follows: numerous gate wires 36 made of a light-shielding conductive material such as Cr or Mo are formed in parallel with one another on a substrate 40. Part of each gate wire 36 is used as a gate electrode 41. The gate electrodes 41 and the substrate 40 are covered with a first insulating film (gate insulating film) 42. Over the first insulating film 42 on the gate electrodes 41 is a semiconductor active film 43 deposited to face the gate electrodes 41. On both edges of the semiconductor active film 43 are ohmic contact films 45, 46 which illustratively include an n+ film and which are formed apart to leave a gap in the middle portion of the semiconductor active film 43.

In the structure above, one ohmic contact film 45 is positioned at one side of the gate electrode 41 and the other ohmic contact film 46 at another side of the gate electrode 41. Thus if one ohmic contact film 45 is inside the area of one pixel part 37, the other ohmic contact film 46 is within the area of an adjacent pixel part 37.

Drain electrodes 48 made of a light-shielding conductive material such as Cr or Mo are each furnished so as to contact the ohmic contact film 45. Source electrodes 49 also constituted by a light-shielding conductive material such as Cr or Mo are each formed to contact the ohmic contact film 46.

A second insulating film (passivation film) 50 is provided to cover the thin film transistors T and the first insulating film 42. Over the second insulating film 50 are pixel electrodes 38 covering the pixel parts 37. The pixel electrodes 38 are connected to the drain electrodes 48 by a connecting conductive film 52 formed in conductive holes 51 made on the second insulating film 50 at edges of the drain electrodes 48 for the thin film transistors T.

As shown in FIG. 2, wire-like transistor-side first electrode films 53 are formed along the source wires 35 on the first insulating film 42 at the thin film transistor forming side of the source wires 35. The transistor-side first electrode films 53 are covered with the second insulating film 50, as depicted in FIG. 1.

As illustrated in FIG. 2, the transistor-side first electrode films 53 are each constituted two by portions: a straight portion 55 extended parallel to the source wires 35 between adjacent thin film transistors T, T; and bent portion 56 continued to the straight portion 55 and bypassing each thin film transistor T. The straight portion 55 of the first electrode film 53 is located so as to face the edge of each pixel electrode 38. The straight portion 55 is arranged so that its inner part will come slightly inside the edge of each pixel electrode 38 and that its outer part will appear slightly out of the edge of each pixel electrode 38. The bent portion 56 is arranged likewise so that part of its inner part will be located slightly inside the edge of each pixel electrode 38 near the thin film transistor T; the bent portion 56 is also arranged so that part of its fringe part will be positioned slightly outside the edge of each pixel electrode 38.

In FIG. 2, the first insulating film 42 opposite to the thin film transistor side of the source wires 35 is covered with source-side first electrode films 58 formed straight along the source wires 35. On the first insulating film 42, each source-side first electrode film 58 is arranged so that its inner part will come slightly inside the edge of each pixel electrode 38 and its outer part slightly outside the edge of each pixel electrode 38. The source-side first electrode films 58 are also covered with the second insulating film 50, as shown in FIG. 1.

The first electrode films 53 . . . , 58 . . . , are extended along the source wires 35 up to the edge of each source wire 35 on the substrate 40. On the fringe of the substrate 40, the first electrode films 53 . . . , 58 . . . , are interconnected and grounded to bear ground potential. Extended up to the edge of each source wire 35, the first insulating films 53, 58 are interconnected illustratively via contact holes made on the second insulating film 50, the holes being connected through transparent conductive films used to form the pixel electrodes 38.

Meanwhile, as shown in FIG. 1, the liquid crystal side of the facing substrate 32 includes a transparent substrate 61 on which a color filter 62 and a common electrode film 63 are deposited, in that order. The color filter 62 has two major components: a black matrix for shielding those thin film transistor portions, gate wire parts and source wire segments which do not contribute to display; and color pixel parts which allow the pixel parts 37 equipped with the pixel electrodes 38 to let light pass through display-contributing regions for color display. The color pixel parts are needed by liquid crystal display apparatuses of a color display structure and are attached to the pixel parts. Contiguous pixel parts need to be made different in color. Illustratively, pixels of three primary colors (red, green and blue) are laid out regularly or randomly to ensure consistent color distribution.

In the cross-section shown in FIG. 1, an oriented film installed on the liquid crystal side of the thin film transistor array substrate 31 and another oriented film on the liquid crystal side of the facing substrate 32 are not shown. Also omitted from the figure are polarized plates outside both the thin film transistor array substrate 31 and the facing substrate 32.

Below is a description of how the liquid crystal display apparatus of the structure shown in FIGS. 1 and 2 works and what effects it provides. The display function of this structure is activated and deactivated by applying and removing a suitable voltage to and from the gap between the pixel electrodes 38 of the desired pixel parts 37 on the one hand and the common electrode film 63 of the facing substrate on the other hand.

The liquid crystal molecules in the areas corresponding to the pixel parts 37 that are given the voltage are controlled in orientation. Light from the backlight under the substrate 40 is introduced into the liquid crystal. The introduced light is either polarized or allowed to pass unmodified according to the oriented or nonoriented state of the liquid crystal molecules, whereby a dark state and a bright state are switched.

The first electrode films 53, 58 are faced with the edges of the pixel electrodes 38 with the second insulating film 50 interposed therebetween. This arrangement generates cumulative capacity between the components to cancel out part of the parasitic capacity created in the liquid crystal display apparatus. Partially negating the parasitic capacity helps stabilize the operation of the thin film transistors T.

The first electrode films 53, 58 face the pixel electrodes 38 with only the second insulating film 50 interposed therebetween. This single-film arrangement allows cumulative capacity to be established more accurately than the conventional structure using two insulating films of different physical properties for setting cumulative capacity. The enhanced level of accuracy in establishing cumulative capacity leads to more stable operation of the thin film transistors T. In other words, because the cumulative capacity of the first embodiment is formed not by a plurality of insulating films as is the case with conventional arrangements but by one insulating film, the inventive single-film structure may have a reduced facing electrode area (i.e., facing area formed by the edges of the pixel electrodes 38 and the first electrode films 53, 58) to provide the same cumulative capacity as that of the conventional multiple insulating film structure. This ensures an improved numeral aperture for the liquid crystal display apparatus of the invention.

With the first embodiment, the single-film structure, if arranged to have the same facing electrode area (i.e., facing area formed by the edges of the pixel electrodes 38 and the first electrode films 53, 58) as that of the conventional multiple insulating film structure, offers a greater cumulative capacity than the latter. The cumulative capacity increased in this manner ensures better signal stabilization.

The first electrode films 53, 58 bear ground potential. This means that an electric field generated by those edges of each pixel electrode 38 which face the grounded first electrode films 53, 58 differs from an electric field generated by the middle portion of the pixel electrode 38. That is, the orientation of liquid crystal in the middle portion of each pixel electrode 38 is different from that in regions forming second electrode films 38A, 38B for the pixel electrode 38. Such a multi-domain display structure helps ease the problem of the narrow angle of visibility characteristic of conventional liquid crystal displays.

Lines of electric force coming from the middle portion of each pixel electrode 38 are directed at the common electrode film 63 of the facing electrode 32, whereas lines of electric force from the edges of the pixel electrode 38 in question are distorted, i.e., attracted toward the first electrode films 53, 58. Because the liquid crystal molecules are torqued perpendicularly to the distorted lines of electric force, the molecules in the middle portion of each pixel electrode 38 constitute one domain while the molecules on those edges of the pixel electrode 38 which face the first electrode films 53, 58 make up another domain. The multi-domain structure maintains states of homogeneous liquid crystal molecule orientation. Applying a suitable voltage to the structure automatically creates a plurality of domains. As a result, each pixel part 37 may be switched automatically to have a plurality of domains comprising homogeneously oriented liquid crystal molecules having the same tilt angle.

The feature above invariably eases abrupt, asynchronous contrast changes of liquid crystal display elements in the vertical direction and thereby widens regions where inversion of gradation will not occur in half tone. This provides a liquid crystal display apparatus that is less restricted by the angle of visibility and offers wider angles of visibility than before.

Figure 3:
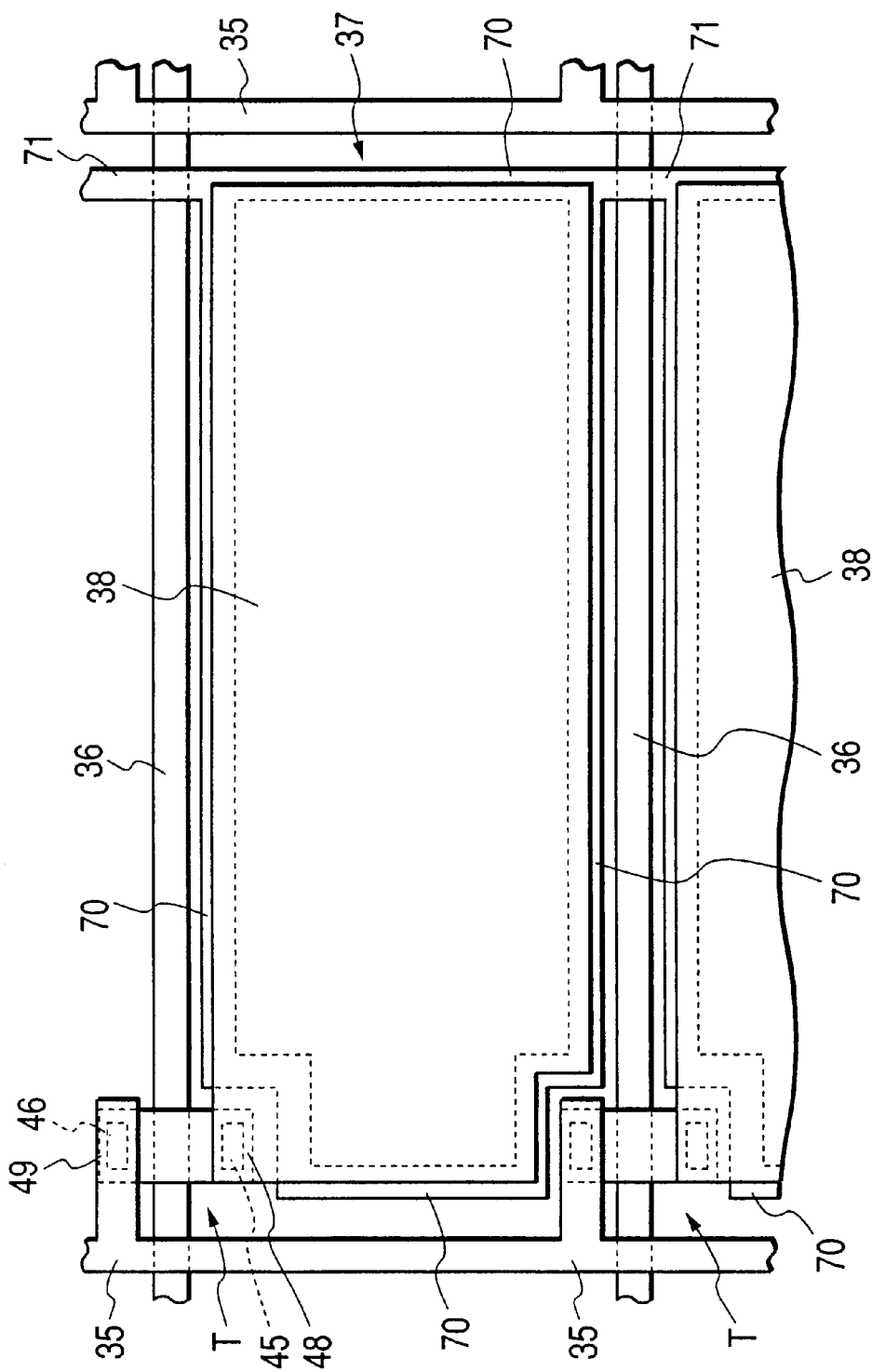
FIG. 3 is a plan view of a liquid crystal display apparatus practiced as a second embodiment of the invention.

FIG. 3 shows a liquid crystal display apparatus practiced as the second embodiment of the invention. What characterizes this embodiment is a ring-shaped first electrode film 70 formed on each pixel part 37 to correspond with the edges of each pixel electrode 38; the first electrode film 70 covers approximately the entire circumference of each pixel electrode 38. The first electrode films 70 attached to the pixel parts 37 are interconnected by connecting conductors 71 arranged parallel to the source wires 35. The connecting conductors 71 are extended up to the end of each source wire on the substrate. On the edge side of the substrate, the connecting conductors 71 are interconnected and grounded so that the first electrode films 70 bear ground potential.

The other structural details of the second embodiment are the same as those of the first embodiment shown in FIGS. 1 and 2. As such, the second embodiment offers the same effects as the first embodiment.

In the structure depicted in FIG. 3, lines of electric force from the pixel electrode 38 are distorted when attracted radially toward the first electrode film 70 surrounding approximately the whole circumference of the pixel electrode 38. When the liquid crystal molecules are torqued perpendicularly to the radially distorted lines of electric force, the molecules constitute a plurality of domains while being homogeneously oriented. As a result, applying a suitable electric field to the structure automatically generates a plurality of domains. Each pixel part 37 may thus be switched automatically to have a plurality of domains comprising homogeneously oriented liquid crystal molecules having the same tilt angle.

In the second embodiment, approximately the entire circumference of each pixel electrode 38, i.e., a wider area than in the first embodiment of FIGS. 1 and 2, distorts the lines of electric force. This means that the second embodiment is more conducive to a multi-domain display constitution than the first embodiment. The second embodiment thus reliably eases abrupt, asynchronous contrast changes of liquid crystal display elements in the vertical direction and thereby widens regions where inversion of gradation will not occur in half tone. This in turn provides a liquid crystal display apparatus that is less constrained by the angle of visibility and offers wider angles of visibility than before.

Figure 4:
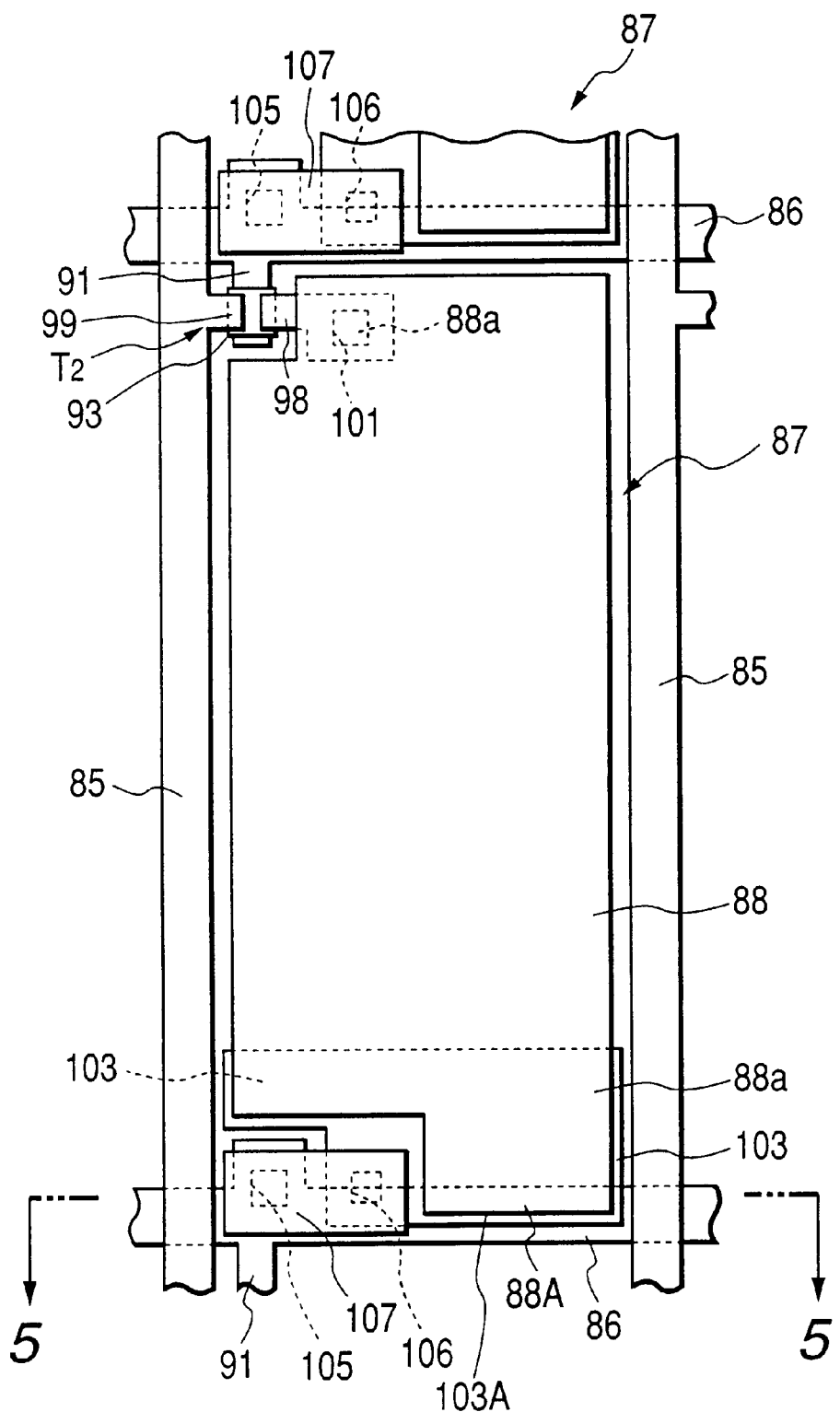
FIG. 4 is a plan view of a liquid crystal display apparatus practiced as a third embodiment of the invention.
Figure 5:
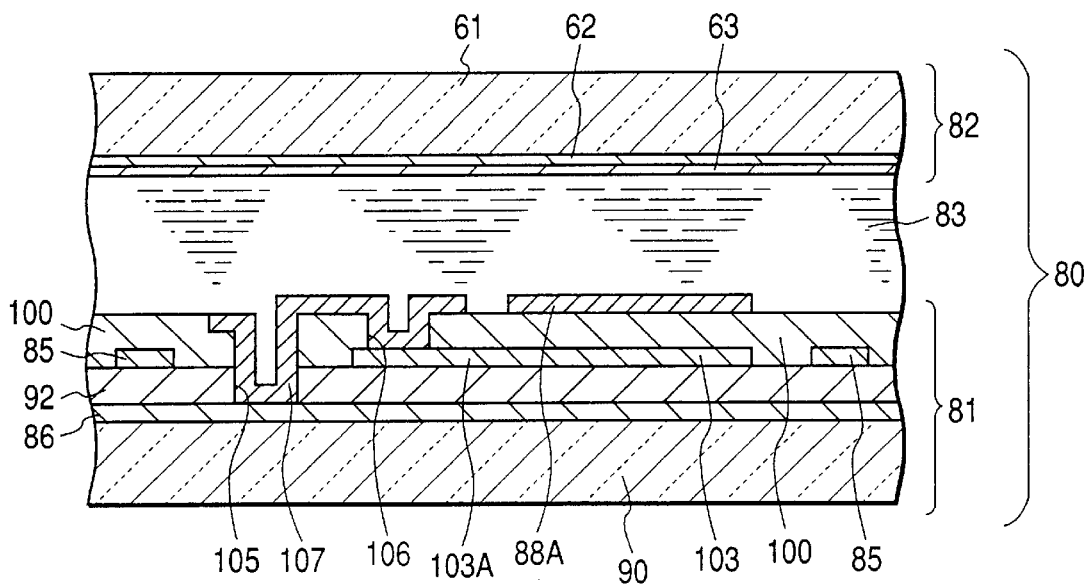
FIG. 5 is a cross-sectional view of the third embodiment.

FIGS. 4 and 5 show a liquid crystal display apparatus 80 practiced as the third embodiment of the invention. FIG. 5 shows a cross-sectional view of the third embodiment, the view being taken on line 5—5 in FIG. 4. The third embodiment differs from the first and second embodiments in terms of an electrode film structure for cumulative capacity generation.

The liquid crystal display apparatus 80 comprises a thin film transistor array substrate 81, a transparent facing substrate 82 positioned parallel to and separate from the thin film transistor array substrate 81, and liquid crystal 83 contained interposingly between the thin film transistor array substrate 81 and the facing substrate 82.

On the thin film transistor array substrate 81, as many source wires 85 and gate wires 86 as in the case of the conventional structure in FIGS. 10 and 11 are arranged in a matrix fashion as viewed from above. Each of the numerous areas surrounded by the source wires 85 and gate wires 86 forms a pixel part 87. A pixel electrode 88 made of a transparent conductive material such as ITO (indium tin oxide) is formed in each of the areas representing the pixel parts 87. In one corner of each of the pixel parts 87, a thin film transistor T2 is formed.

FIG. 4 is an enlarged plan view showing a thin film transistor T2 and its surroundings corresponding to one pixel part 87 surrounded by source wires 85 and gate wires 86. Numerous pixel parts 87 are arranged on the thin film transistor array substrate 81 to form a display screen of the liquid crystal display apparatus 80.

More specifically, the thin film transistor array substrate 81 is structured as follows: at the pixel parts 87, numerous gate wires 86 made of a light-shielding conductive material such as Cr or Mo are formed in parallel with one another on a substrate 90. Part of each gate wire 86 is extended for use as a gate electrode 91. The gate electrodes 91 and the substrate 90 are covered with a first insulating film (gate insulating film) 92. Over the first insulating film 92 on the gate electrodes 91 is a semiconductor active film 93 deposited to face the gate electrodes 91. On both edges of the semiconductor active film 93 are a drain electrode 98 and a source electrode 99 with an ohmic contact film (e.g., n+ film) interposed therebetween. The source wires 85 are formed on the first insulating film 92.

A second insulating film (passivation film) 100 is provided to cover the thin film transistors T2, the first insulating film 92 and the source wires 85. Each pixel electrode 88 is formed to cover most of that area on the second insulating film 100 which corresponds to a pixel part 87. The pixel electrode 88 is connected to a drain electrode 98 through a connecting conductive film 88a in a contact hole 101 formed on the second insulating film 100 at the edge of the drain electrode 98 of the thin film transistor T2. Opposite to that portion of the pixel electrode 88 which is connected to the thin film transistor T2 is an extension part 88A extended up to that area of the gate wire 86 which corresponds to an adjacent pixel part 87. Each extension part 88A covers approximately half the length of the gate wire 86 corresponding to one pixel part 87.

On that edge of the pixel electrode 88 which has no thin film transistor T2 is a first electrode film 103 formed between right- and left-hand source wires 85 on the first insulating film 92. The first electrode film 103 is covered with the second insulating film 100.

The first electrode film 103 has an extension part 103A extended up to that area of each gate wire 86 which corresponds to the adjacent pixel part 87 as in the case of the pixel electrode 88. The extension part 103A is formed to occupy a wider area than the extension part 88A. A contact hole 105 reaching each gate wire 86 is formed on the second insulating film 100 and on that portion of the first insulating film 92 which is not covered with the extension part 103A. Another contact hole 106 reaching the first electrode film 103 is formed on the second insulating film 100 adjacent to the contact hole 105. A connecting path 107 spanning the contact holes 105 and 106 connects electrically each gate wire 86 with the first electrode film 103. On the edge of each pixel electrode 88, the first electrode film 103 faces the extension part (edge) 88A of the pixel electrode 88 with the second insulating film 100 interposed therebetween. The first electrode film 103 and the edge 88A serve as facing electrodes which, together with the second insulating film 100, constitute cumulative capacity.

In the structure shown in FIGS. 4 and 5, the second insulating film 100 is sandwiched between the first electrode film 103 and the edge 88A of each pixel electrode 88 to form cumulative capacity. The cumulative capacity thus generated cancels out part of the parasitic capacity created in the liquid crystal display apparatus. Partially negating the parasitic capacity helps stabilize the operation of the thin film transistors T2.

The first electrode film 103 faces the edge 88A of each pixel electrode 88 with only the second insulating film 100 interposed therebetween. This arrangement allows cumulative capacity to be established more accurately than the conventional structure using two insulating films of different physical properties for setting cumulative capacity. The enhanced level of accuracy in establishing cumulative capacity ensures more stable operation of the thin film transistors T2.

Below is a description of major benefits made available when the structure of the thin film transistor array substrate shown in FIGS. 4 and 5 is adopted. The benefits of the inventive structure will be discussed in connection with a method for fabricating the structure in question.

The thin film transistor array substrate of FIGS. 4 and 5 is fabricated as follows: a light-shielding conductive metal film made illustratively of Cr or Mo is formed all over the substrate 90. The film-covered substrate is subjected to a patterning process wherein unnecessary parts are removed by etching through the use of a first mask. The patterning process leaves gate electrodes and gate wires formed on the substrate 90 as shown in FIG. 4, viewed from above.

The etched substrate is covered with a first insulating film (gate insulating film), a semiconductor active film and an ohmic contact film. The substrate with its newly deposited films is subjected to another patterning process wherein island-like semiconductor active films and ohmic contact films are formed by use of a second mask.

With these conductive metal films deposited, the substrate undergoes another patterning process wherein a third mask is used to form source electrodes, source wires, drain electrodes, and first electrode films between adjacent source wires. Then the unnecessary portions of the island-like ohmic contact films between the source and drain electrodes and of the semiconductor active films are removed by etching to form channel parts in the form of thin film transistors. No special mask is needed to form the channels because the source electrodes, source wires, drain electrodes, and the first electrode films between adjacent source wires stemming from the preceding patterning are used as a mask.

The substrate is then covered with a second insulating film (passivation film). A fourth mask is deposited on the second insulating film before the substrate is etched to form contact holes reaching the gate wires, the first electrode films and the drain electrodes. Where the contact holes attaining the gate wires are formed, both the first and the second insulating films are etched and the etching process stops at the gate wires made of a conductive metal film.

Thereafter, a transparent conductive film (ITO) is deposited on the second insulating film where the contact holes have been made. The transparent conductive film is formed so as to cover the second insulating film and to fill the contact holes thereon. Then the transparent conductive film is patterned by use of a fifth mask to form pixel electrodes. What is left from this patterning process are transparent pixel electrode parts covering the contact holes. The process forms connecting paths that connect electrically the first conductive film under the second insulating film with the gate wires under the first insulating film. The result is the thin film transistor array substrate 81 whose structure is depicted in FIGS. 4 and 5.

The method above for fabricating the thin film transistor array substrate utilizes five masks. The smallest possible number of necessary masks simplifies the fabrication process and enhances the yield of products. Whereas a method to be discussed below employs six masks, the above method uses only five, which contributes to improving the yield rate.

Figure 6:
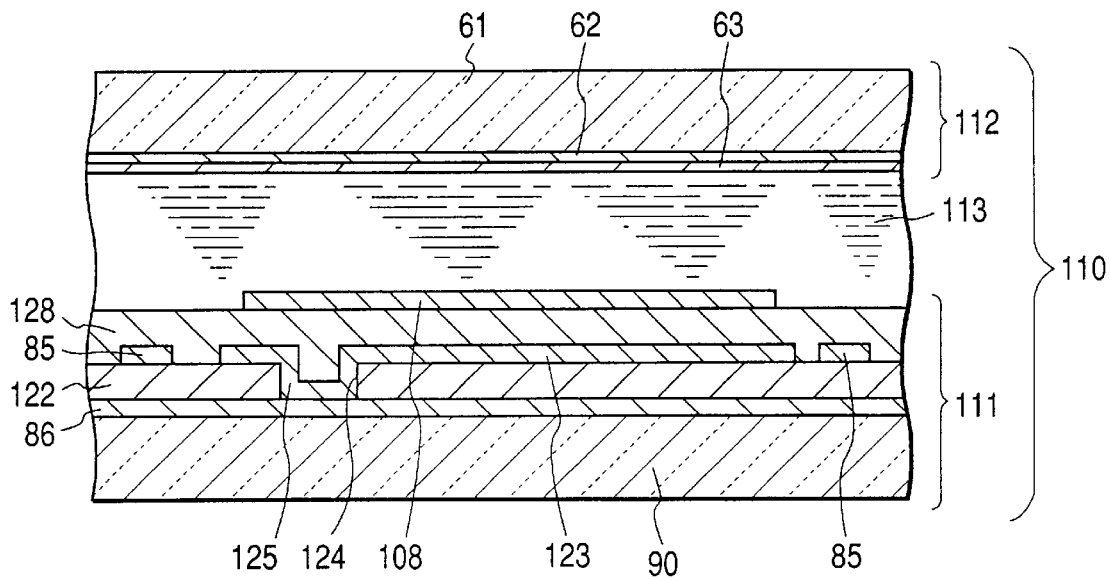
FIG. 6 is a cross-sectional view of a liquid crystal display apparatus practiced as a fourth embodiment of the invention.
Figure 7:
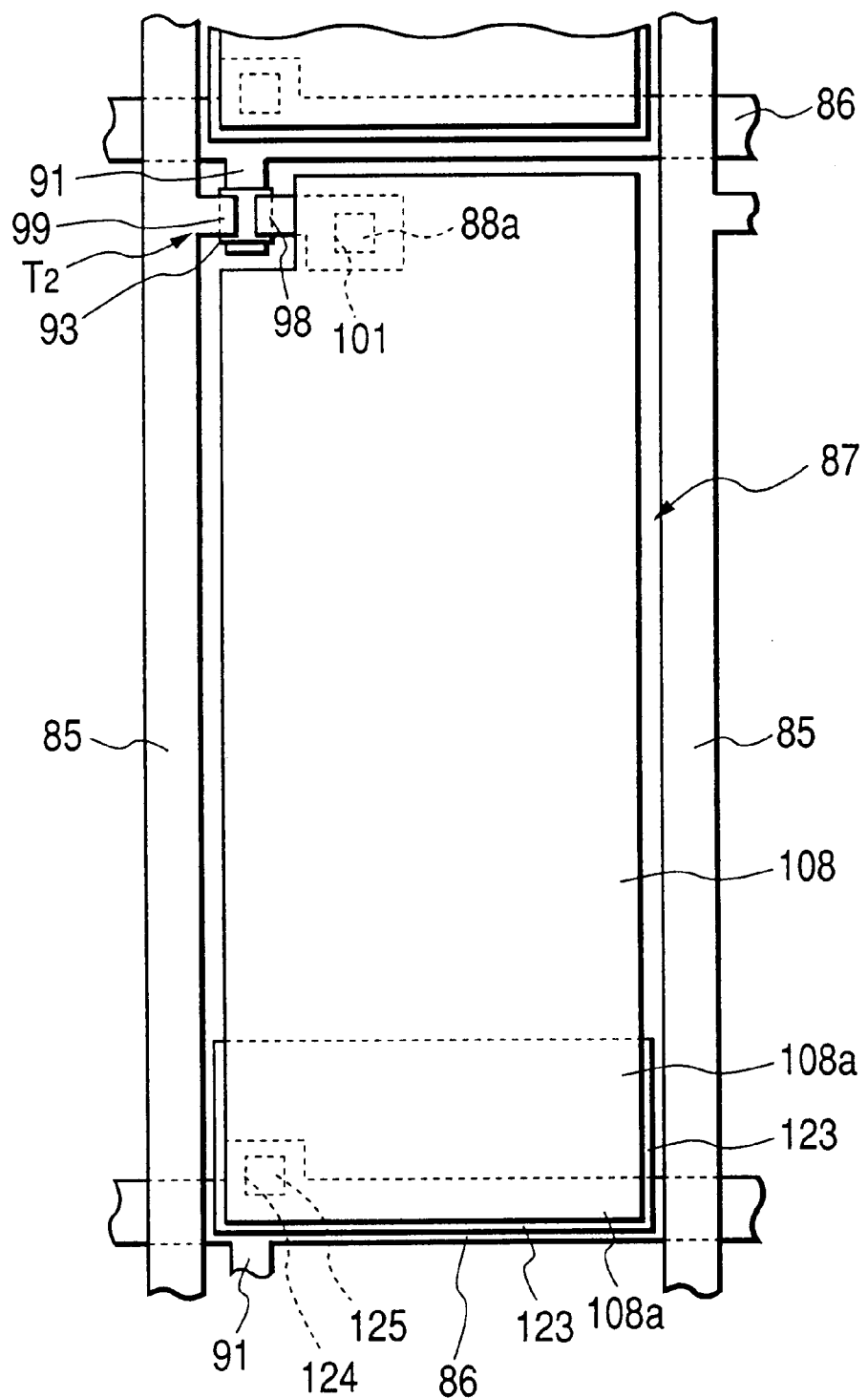
FIG. 7 is a plan view of the fourth embodiment.

FIGS. 6 and 7 show a liquid crystal display apparatus practiced as the fourth embodiment of the invention. This embodiment is basically the same as that in FIGS. 4 and 5 except for a different connecting structure between the gate wires 86 and edges 108a of the pixel electrodes 108.

In the structure of the fourth embodiment, a first insulating film (gate insulating film) 122 and a second insulating film (passivation film) 128 are deposited. A first electrode film 123, combined with the edge 108a of each pixel electrode 108 to form cumulative capacity, is structured and connected in ways different from those of the third embodiment. However, the major benefits in connection with the generation of cumulative capacity are the same as those of the third embodiment.

Contact holes 124 reaching the gate wires 86 are formed only on the first insulating film 122. The contact holes 124 are used to form connecting paths 125 that connect the first electrode film 123 with the gate wires 86. An extension part 108a at the edge of each pixel electrode 108 is as wide as one pixel part 87. The extension part 108a is formed so as to cover most of the gate wire 86 corresponding to each pixel part 87. The first electrode film 123 is also formed in an extended manner to cover most of the gate wire 86 corresponding to each pixel part 87.

The thin film transistor array substrate shown in FIGS. 6 and 7 is fabricated as follows: on the substrate 90, gate electrodes and gate wires are first formed by a patterning process using a first mask, as in the case of the third embodiment. A first insulating film is deposited likewise on the patterned substrate. A second mask is used to form island-like semiconductor active films and ohmic contact films on the substrate.

A third mask is then used on a gate insulating film for a patterning process whereby contact holes are made. With the contact holes provided, a conductive metal film is deposited to serve as source and drain electrodes. A fourth mask is used for another patterning process whereby source electrodes, source wires, drain electrodes, and electrodes for generating cumulative capacity are formed. The films thus patterned are used to etch channel parts out of the semiconductor active films. Then a passivation film of $SiN_x$ is deposited on the whole assembly.

A fifth mask is used to etch the passivation film, whereby contact holes reaching the drain electrodes are formed. With the passivation film etched to form the contact holes, a transparent conductive film (ITO) is deposited in preparation for making up transparent pixel electrodes. A sixth mask is then used to fabricate both the transparent pixel electrodes and electrodes for generating cumulative capacity at the same time. The result is the structure whose cross-section is shown in FIG. 6. In the manner described, six masks are used to fabricate the structure depicted in FIG. 6.

Figure 8:
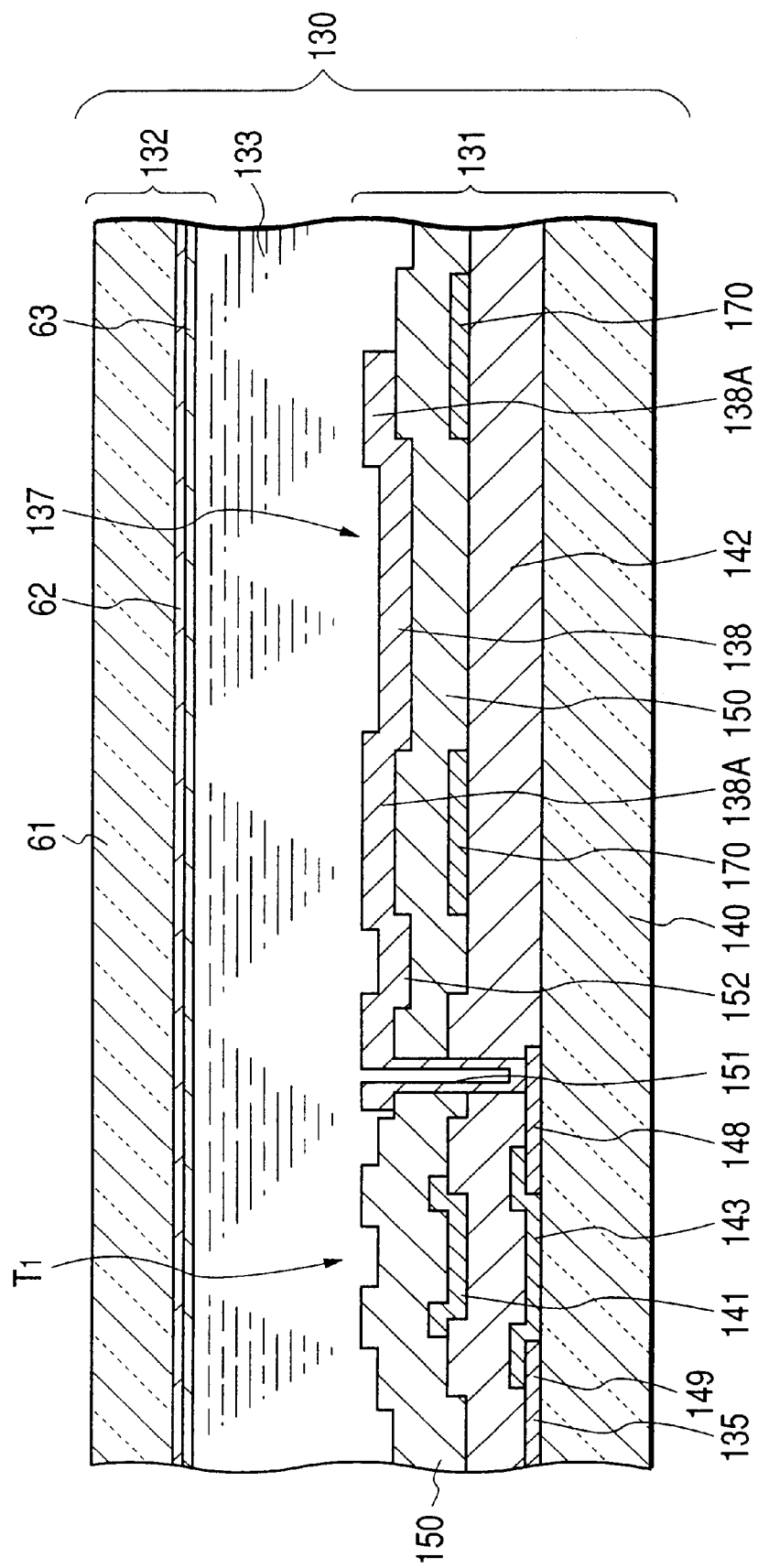
FIG. 8 is a cross-sectional view of a liquid crystal display apparatus of a forward staggered type practiced as another embodiment of the invention.
Figure 9:
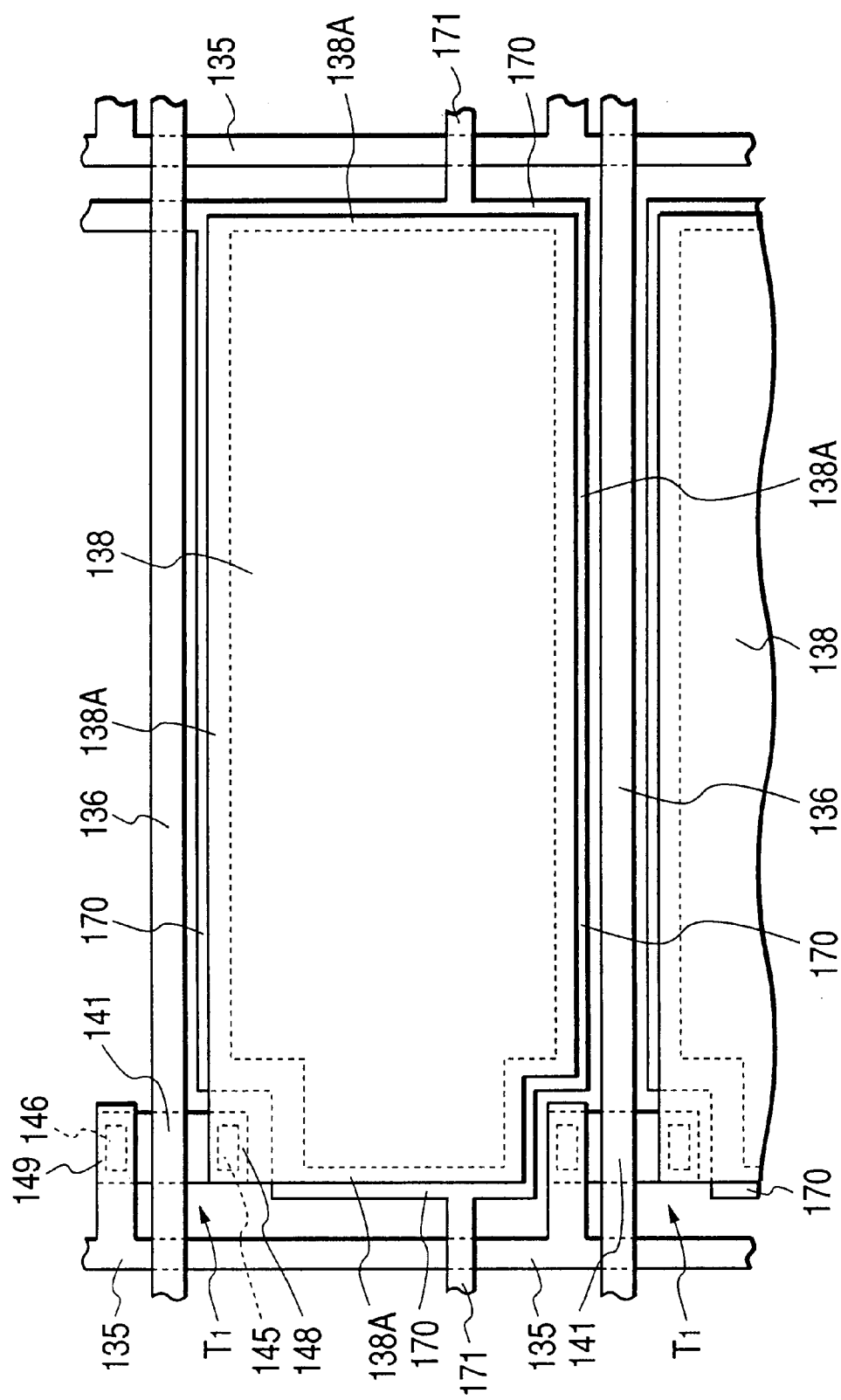
FIG. 9 is a plan view of the embodiment of FIG. 8.

FIGS. 8 and 9 are a cross-sectional view and a plan view of a liquid crystal display apparatus 130 of a forward staggered type practiced as another embodiment of the invention. The liquid crystal display apparatus 130 comprises a thin film transistor array substrate 131, a transparent facing substrate 132 positioned parallel to and separate from the thin film transistor array substrate 131, and liquid crystal 133 contained interposingly between the thin film transistor array substrate 131 and the facing substrate 132.

On the thin film transistor array substrate 131, as many source wires 135 and gate wires 136 as in the case of the conventional structure in FIGS. 10 and 11 are arranged in a matrix fashion as viewed from above. Each of the numerous areas surrounded by the source wires 135 and gate wires 136 forms a pixel part 137. A pixel electrode 138 made of a transparent conductive material such as ITO (indium tin oxide) is formed in each of the areas representing the pixel parts 137. In one corner of each of the pixel parts 137, a thin film transistor $T_1$ is formed so as to extend to part of an adjacent pixel part 137.

FIG. 9 is an enlarged plan view showing a thin film transistor $T_1$ and its surroundings corresponding to one pixel part 137 surrounded by source wires 135 and gate wires 136.

Numerous pixel parts 137 are arranged on the thin film transistor array substrate 131 to form a display screen of the liquid crystal display apparatus 130.

More specifically, the thin film transistor array substrate 131 is structured as follows: at the pixel parts 137, numerous source wires 135 are formed in parallel with one another on a substrate 140. Part of each source wire 135 is used as a source electrode 149. Opposite to each source electrode 149 is a drain electrode 148 formed on the substrate 140. A semiconductor active film 143 is provided on the substrate 140 to connect each source electrode 149 with the corresponding drain electrode 148. The electrodes and the film are covered with a first insulating film (gate insulating film) 142. On the first insulating film 142 over the semiconductor active film 143 are gate electrodes 141 facing the semiconductor active film 143.

A second insulating film (passivation film) 150 is deposited on the thin film transistors $T_1$ and first insulating film 142. On the second insulating film 150 are pixel electrodes 138 covering the areas corresponding to the pixel parts 137. The pixel electrodes 138 are connected to the drain electrodes 148 through the first insulating film 142 at the edge of the drain electrode 148 of each thin film transistor $T_1$ as well as through a connecting conductive film 152 in conductive holes 151 formed on the second insulating film 150.

A first electrode film 170 furnished corresponding to the edge of each pixel electrode 138 is shaped like a ring at each pixel part 137. As such, the first electrode film 170 surrounds approximately the entire circumference of each pixel electrode 138. The first electrode films 170 at the pixel parts 137 are interconnected by connecting conductors 171 arranged parallel to the gate wires 136. The connecting conductors 171 extending to the edge of each gate wire on the substrate are interconnected and grounded at the substrate fringe. This causes the first electrode films 170 to bear ground potential. That portion of each pixel electrode 138 which faces the first electrode film 170 constitutes a second electrode film 138A.

The above liquid crystal display apparatus 130 using forward staggered type thin film transistors provides benefits equivalent to those offered by the second embodiment of FIG. 3. Specifically, cumulative capacity is generated by the first electrode film 170 surrounding the entire circumference of each pixel electrode 138 and by the second electrode film 138 corresponding to the first electrode film 170. This structure cancels out part of the parasitic capacity created inevitably in the liquid crystal display apparatus, thus helping to stabilize the operation of the thin film transistors $T_1$.

The cumulative capacity of the above embodiment is formed not by a plurality of insulating films (i.e., gate insulating film and passivation film) as is the case with conventional arrangements but by one insulating film (passivation film 150 alone). The inventive structure may have a reduced facing electrode area (i.e., facing area formed by the edges of the pixel electrodes 138 and by the first electrode films 170) to provide the same cumulative capacity as that of the conventional multiple insulating film structure. This ensures an improved numeral aperture for the liquid crystal display apparatus of the invention.

With the above embodiment, the single-film structure, when arranged to have the same facing electrode area (i.e., facing area formed by the edges of the pixel electrodes 138 and by the first electrode films 170) as that of the conventional multiple insulating film structure, provides a greater cumulative capacity than the latter. The cumulative capacity increased in this manner ensures better signal stabilization.

In the structure depicted in FIGS. 8 and 9, lines of electric force from the pixel electrode 138 are distorted when attracted radially toward the first electrode film 170 surrounding approximately the whole circumference of each pixel electrode 138. When the liquid crystal molecules are torqued perpendicularly to the radially distorted lines of electric force, the molecules constitute a plurality of domains while being homogeneously oriented. As a result, applying a suitable electric field to the structure automatically generates a plurality of domains. Each pixel part 137 may thus be switched automatically to have a plurality of domains comprising homogeneously oriented liquid crystal molecules having the same tilt angle.

In this manner, an area as wide as approximately the entire circumference of each pixel electrode 138 distorts the lines of electric force to bring about a multi-domain display arrangement. The multi-domain feature reliably eases abrupt, asynchronous contrast changes of liquid crystal display elements in the vertical direction and thereby widens regions where inversion of gradation will not occur in half tone. This in turn provides a liquid crystal display apparatus that is less constrained by the angle of visibility and offers wider angles of visibility than before.

EXAMPLE

The inventors compared in concrete terms the thin film transistor array substrate of the first embodiment in FIGS. 1 and 2 with the conventional thin film transistor array substrate in FIGS. 10 and 11. In the structure of FIGS. 1 and 2, the facing area between the first and the second electrode films for generative cumulative capacity at each pixel part was set for 675 $\mu m^2$. A passivation film 0.4 $\mu m$ thick and made of silicon nitride was placed interposingly as a dielectric film between the first and the second electrode films. This structure provided a capacity of 0.1 pF.

In the structure of FIGS. 10 and 11, by contrast, the facing area between the first and the second electrode films for generating cumulative capacity at each pixel part was set for 1,000 $\mu m^2$. A passivation film 0.4 $\mu m$ thick and made of silicon nitride and a gate insulating film 0.3 $\mu m$ thick and composed of silicon nitride were placed interposingly as dielectric films between the first and the second electrode films. This structure yielded a capacity of 0.085 pF.

The comparison above showed that the inventive structure of FIGS. 1 and 2, given the same facing area as that of the conventional arrangement, boosts cumulative capacity by about 70% over the latter. The dielectric constant of the passivation film measured about 6.7, approximately the same for both the inventive and the conventional structures.

The above comparison also indicated that the inventive structure of FIGS. 1 and 2 having the same cumulative capacity as that of the conventional arrangement in FIGS. 10 and 11 may have a 1.5% reduction in the facing area between the first and the second electrode films in acquiring the capacity of 0.085 pF. Given the same cumulative capacity, this feature translated into an improvement of about 1% in numerical aperture for the inventive liquid crystal display apparatus over comparable conventional devices.

As described, the liquid crystal display apparatus having inversely staggered thin film transistors according to the invention comprises: a first insulating film separating a gate insulating film from a semiconductor active film; and a second insulating film furnished independently of the first insulating film and interposed between a first electrode film and pixel electrodes facing the first electrode film; wherein the second insulating film alone is used as a dielectric film to form cumulative capacity. Whereas the conventional structure needs two different insulating films sandwiched by electrode films to constitute cumulative capacity, the inventive single-film setup having the same facing electrode area as that of its conventional counterpart offers a higher cumulative capacity than the latter. This feature translates into more stable operation of the thin film transistors. If the cumulative capacity of the inventive structure is the same as that of the conventional setup, the inventive structure needs a less facing electrode area than the latter. This ensures an improved numerical aperture for the liquid crystal display apparatus.

In the liquid crystal display apparatus of the invention, the film for forming source and drain electrodes may also be used to constitute the first electrode film. That is, the film treatment for fabricating the source and drain electrodes, when combined with patterning, creates the first electrode film at the same time. The facing electrodes are also formed simultaneously through the film treatment for fabricating the pixel electrode in conjunction with patterning. The inventive structure thus provides the electrode film without complicating the fabrication process and with no decline in the yield rate.

Where connecting paths penetrating the first and the second insulating films are used in the inventive structure to connect the pixel electrodes with the gate wires, the connecting paths may be fabricated simultaneously with the pixel electrodes being patterned. With a smaller number of masks thus in use, the fabrication process may be made simpler than before.

Where the first electrode film is arranged to bear ground potential, the electric field stemming from that edge of each pixel electrode which faces the grounded first electrode film differs from the electric field from the middle of the pixel electrode in question. That is, the liquid crystal in the middle region of each pixel electrode is oriented differently from the liquid crystal in the second electrode film side area of the pixel electrode in question. Such a multi-domain arrangement is conductive to easing the problem of constrained angles of visibility that has plagued liquid crystal display apparatuses.

Lines of electric force stemming from the middle portion of each pixel electrode proceed unchanged to the corresponding common electrode film on the facing electrode, while lines of electric force from the edge of the pixel electrode in question are distorted when attracted to the first electrode film. Because liquid crystal molecules are torqued perpendicularly to the distorted lines of electric force, the molecules constitute a plurality of domains, i.e., in the middle region of each pixel electrode, and on its edge facing the first electrode film, while they are homogeneously oriented. As a result, applying a suitable electric field to the inventive structure automatically generates a plurality of domains. Each pixel part may thus be switched automatically to have a plurality of domains comprising homogeneously oriented liquid crystal molecules having the same tilt angle.

In this manner, the multi-domain feature reliably eases abrupt, asynchronous contrast changes of liquid crystal display elements in the vertical direction and thereby widens regions where inversion of gradation will not occur in half tone. This in turn provides a liquid crystal display apparatus that is less constrained by the angle of visibility and offers wider angles of visibility than before.

The above structure applies not only to liquid crystal display apparatuses having inversely staggered thin film transistors but also to those equipped with forward staggered thin film transistors. In both cases, the major benefits available from the invention are equivalent.

As many apparently different embodiments of this invention may be made without departing from the spirit and scope thereof, it is to be understood that the invention is not limited to the specific embodiments thereof except as defined in the appended claims.

What is claimed is:

1. A liquid crystal display apparatus comprising:

a substrate;

gate wires and source wires formed in a matrix on said substrates;

gate electrodes formed in proximity to points of intersection between said gate wires and source wires, said gate electrodes being connected electrically to said gate wires;

a first insulating film formed on said gate wires and said gate electrodes, said first insulating film further carrying said source wires thereon;

a semiconductor active film formed over said gate electrodes with said first insulating film interposed therebetween;

source electrodes formed on said semiconductor active film and connected with said source wires;

drain electrodes formed on said semiconductor active film and isolated from said source electrodes;

an electrode film formed on said first insulating film, said electrode film being proximate to and in parallel with said source wires, said electrode film generating capacitance;

a second insulating film formed on said first insulating film, said first insulating film carrying said electrode film, said source wires, said source electrodes, said drain electrodes and said semiconductor active film thereon; and pixel electrodes connected to said drain electrodes and formed on said second insulating film, said pixel electrodes generating capacitance in cooperation with said electrode film;

wherein said pixel electrode has a first end and a second end, said electrode film is disposed at said first end of said pixel electrode, said gate electrode, said source electrode, and said drain electrode are disposed at said second end of said pixel electrode to drive said pixel electrode;

a first contact hole is formed in both said first insulating film and said second insulating film to a longitudinal portion of the gate wiring located adjacent to and corresponding with said pixel electrode;

a second contact hole is formed in said second insulating film to said electrode film; and a connecting path electrically connecting said electrode film and the gate wiring adjacent to said pixel electrode via said first and second contact holes is formed simultaneously with forming said pixel electrode.

2. A liquid crystal display apparatus according to claim 1, wherein said pixel electrode comprises an extension part that extends to the gate wiring adjacent to and corresponding with said pixel electrode, and said extension part partially covers half the longitudinal portion of said gate wire.

3. A liquid crystal display apparatus to claim 2, wherein said electrode film comprises an extension part which extends to partially cover the longitudinal portion of the gate wire adjacent to and corresponding wire said pixel electrode, and the extension part of said electrode film overlaps with the extension part of said pixel electrode on said gate wiring, and is located outside an outer configuration of the extension part of said pixel electrode.

4. A liquid crystal display apparatus according to claim 3, wherein said second contact hole is formed on said second insulating film on the extension part of said electrode film which covers said gate wiring and which is located outside the outer configuration of the extension part of said pixel electrode.

5. A liquid crystal display apparatus according to claim 1, wherein said electrode film comprises an extension part that extends to partially cover the longitudinal portion of the gate wire adjacent to and corresponding with said pixel electrode.

6. A liquid crystal display apparatus according to claim 5, wherein said second contact hole is formed on said second insulating film on the extension part of said electrode film which covers said gate wiring.

* * * * *

UNITED STATES PATENT AND TRADEMARK OFFICE
CERTIFICATE OF CORRECTION

PATENT NO. : 6,184,945 B1　　　　　　　　　　　　　　　　　　　　　　Page 1 of 1
DATED : February 6, 2001
INVENTOR(S) : Chae Gee Sung It is certified that error appears in the above-identified patent and that said Letters Patent is hereby corrected as shown below:

<u>Title page,</u>
<u>Column 1,</u>
Line 5, under "U.S. PATENT DOCUMENTS", change "6/2000" to -- 6/1999 --.

Signed and Sealed this

Nineteenth Day of March, 2002

Attest:

JAMES E. ROGAN
*Attesting Officer*　　*Director of the United States Patent and Trademark Office*